United States Patent [19]
Pardy

[11] 3,760,650
[45] Sept. 25, 1973

[54] ENERGY ABSORBING STEERING COLUMN

[75] Inventor: Ronald Peter Pardy, Hockley, England

[73] Assignee: Ford Motor Company, Dearborn, Mich.

[22] Filed: Sept. 19, 1972

[21] Appl. No.: 290,305

[52] U.S. Cl. ................................................ 74/492
[51] Int. Cl. ............................................. B62d 1/18
[58] Field of Search ............................. 74/492, 493

[56] References Cited
UNITED STATES PATENTS
3,677,106   7/1972   Weston .................................. 74/492

*Primary Examiner*—Milton Kaufman
*Attorney*—Keith L. Zerschling et al.

[57] ABSTRACT

An energy absorbing steering column is mounted in a motor vehicle between spaced apart portions of body structure. One end of the steering column abuts the toe board of the floor pan and threadedly adjustable release means connected to the other end of the column engages a body supported bracket. An intermediate portion of the column is constructed to plastically collapse under an impact load with the adjustable means freely disengaging from its support bracket.

11 Claims, 2 Drawing Figures

PATENTED SEP 25 1973

3,760,650 ly to energy absorbing
steering column assemblies for motor vehicles, and
more particularly to a method for mounting a steering
column in a vehicle.

ENERGY ABSORBING STEERING COLUMN

BACKGROUND OF THE DISCLOSURE

This invention relates generally to energy absorbing steering column assemblies for motor vehicles, and more particularly to a method for mounting a steering column in a vehicle.

Conventionally, the upper end of an energy absorbing or collapsible steering column is supported by a bracket that is normally rigid but which gives way in the event of abnormal loading. Such brackets usually depend upon the shearing or deforming of plastic or metal parts for that function. Such brackets are vulnerable to damage when being transported or stored prior to assembly.

BRIEF SUMMARY OF THE DISCLOSURE

According to the presently preferred embodiment of this invention, a motor vehicle steering column has the following features:

a. an energy absorbing steering column assembly is supported at its upper end by its engagement with a bracket rigidly affixed to the body structure of the vehicle;

b. interengaging formations on the bracket and the steering column are freely disengageable upon downward movement of the upper end of the steering column; and c. such downward movement is normally prevented by reaction of the lower end of the column against vehicle body structure.

The interengaging formations on the body supported bracket and the steering column may include threadedly adjustable means to secure the column in position during normal usage.

BRIEF DESCRIPTION OF THE DRAWINGS

The many objects and advantages of a motor vehicle steering column constructed in accordance with this invention will become apparent upon consideration of the following detailed discussion and the accompanying drawings, in which.

DETAILED DESCRIPTION OF THE PREFERRED EMBODIMENT

Figures 1, 2:
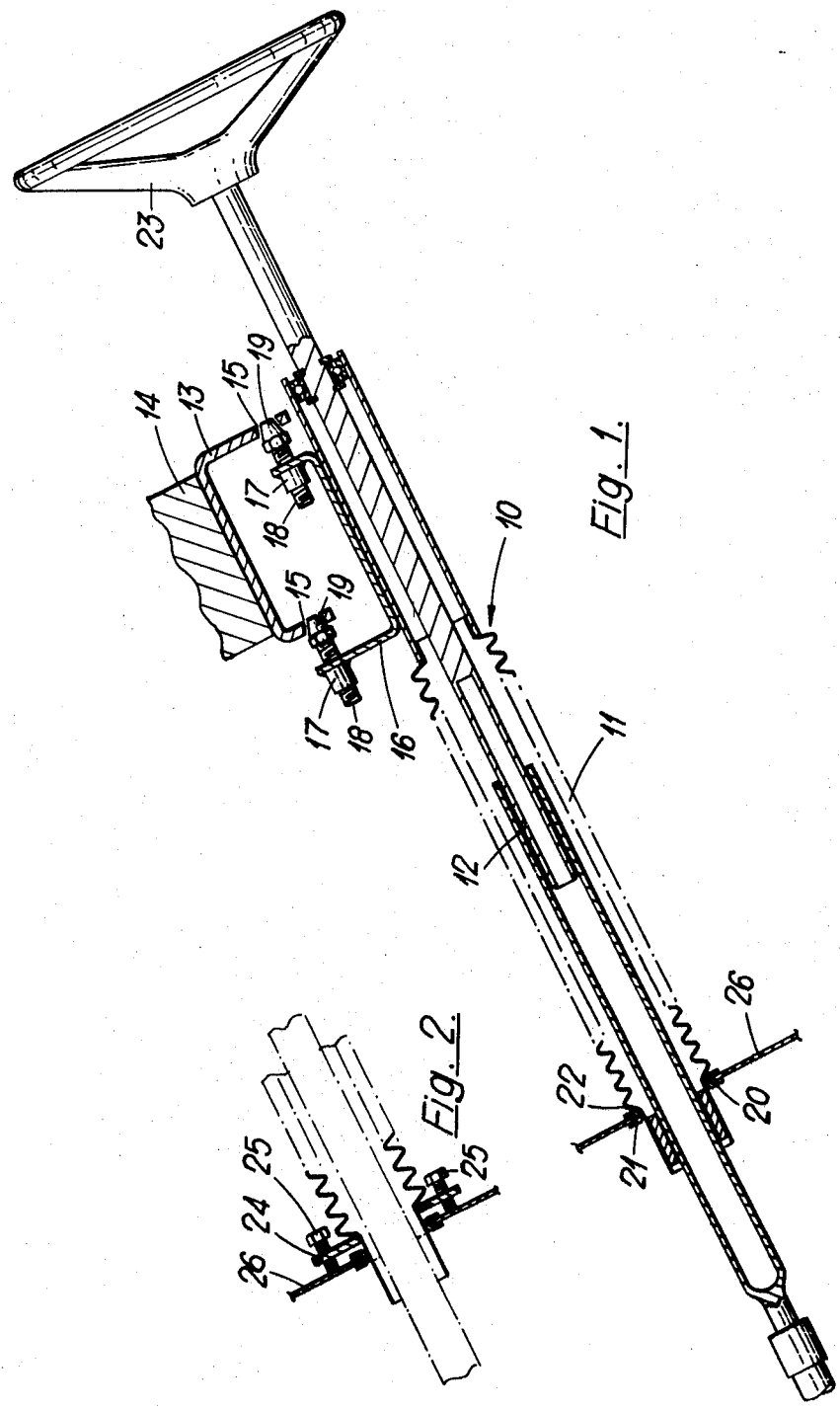
FIG. 1 is a side elevational view, partly in section, of a steering column assembly embodying the invention.
FIG. 2 is a side elevational view, partly in section, of a modification of the lower support for the steering column shown in FIG. 1.

Referring now to the drawings, wherein the presently preferred embodiments of a steering column assembly constructed in accordance with this invention is illustrated, FIG. 1 shows a column assembly 10 installed in a motor vehicle. The energy absorbing steering column 10 includes a tube 11 having a corrugated section arranged to plastically deform or collapse under an axial impact load and to absorb at least some of the impact energy.

A two-piece telescopic steering shaft assembly 12 is supported by bearings within the corrugated tube 11. A steering wheel 23 is connected to the upper end of the shaft assembly 12. The lower end of the shaft 12 is constructed to be connected to a steering gear.

An upper bracket 13 is rigidly affixed to the body structure 14 of a motor vehicle which may comprise a portion of an instrument panel. The bracket 13 has a pair of depending flanges in which tapered sockets 15 are formed.

A bracket 16 is welded to the upper side of the corrugated tube 11 and has a pair of upstanding flanges spaced from the depending flanges of the bracket 13. Weld nuts 17 on the flanges of the bracket 16 each receive a bolt 18 having a head that forms a tapered projection 19.

The weld nuts 17 are so positioned that when the steering column assembly 10 is in its operative position, each projection 19 is engageable with a respective socket 15.

The steering column assembly 10 is mounted in the vehicle by inserting its lower end through an aperture 20 in the toe board portion of the vehicle body floor pan 26. The aperture 20 is lined by a rubber ring 21 against which the lowermost of the corrugations 22 is seated. During installation, the steering column 10 is held in its operative position while the bolts 18 are threaded rearwardly to bring the projections 19 into engagement with the respective sockets 15.

When the bolts 18 are tightened, the steering column 10 will be effectively trapped between its lower engagement with the body structure 26 and the engagement with the bracket 13. The bolts 18 are tightened so that the column tube 11 is loaded very lightly in compression. This provides a positive engagement preventing rattling of the several steering column parts.

It will be readily appreciated from FIG. 1 that although the steering column 10 is rigidly supported during normal loading, there is nothing to oppose axial forward collapse of the corrugated tube 11. The projections 19 and the sockets 15 are aligned with the steering column axis. The projections 19 readily disengage from the socket 15 in the event an impact load is exerted against the steering wheel 23 whereby the corrugated tube 11 is free to collapse.

The toe board portion of the floor pan 26 acts as a reaction member both for the support of the column 10 when the bolts 18 are tightened and for the collapse of the corrugated section of the tube 11 when an impact load is imposed on the steering wheel 23.

ALTERNATE EMBODIMENT

FIG. 2 illustrates an alternate embodiment of a steering column constructed in accordance with this invention. In this alternate embodiment, the support for the upper end of the steering column may include the threadedly adjustable projections 19 or it may include projections that are fixed with respect to the steering column bracket 16. In either case, the embodiment of FIG. 2 includes tapered projections affixed to the steering column at its upper end and which engage tapered sockets formed in a bracket fixed to body structure.

The distinguishing feature of the FIG. 2 embodiment is the support provided for the lower end of the column. A thrust ring 24 of annular construction engages the lowermost corrugation 22 of the corrugated column tube 11. Bolts 25 extend through the thrust ring 24 and engage the floor pan 26. When the bolts 25 are tightened, the column 11 is displaced rearwardly causing the projections 19 to engage the sockets 15.

The column of FIG. 2 operates in the same manner as the column of FIG. 1. In both embodiments, the upper end of the column is free to disengage from its support on the body structure when an impact load upon the steering wheel causes the corrugated column tube to collapse. Disengagement of the column from the body in the area of the instrument panel is not dependent upon fracture of a frangible piece.

The foregoing description presents the presently preferred embodiment of this invention. Modifications and alterations may occur to those skilled in the art that will come within the scope and spirit of the following claims.

I claim:

1. An energy absorbing steering column for a motor vehicle having first and second spaced-apart body structures, said steering column having first and second spaced-apart column support portions, first means constructed to support said first column portion on said first body structure, said first means being constructed to prevent forward displacement of said first column portion, second means supporting said second column portion on said second body structure, said second means being constructed to prevent the rearward displacement of said second column portion, adjustable means constructed to increase the effective length of said steering column supported between said first and second body structures, said second means being constructed to permit unrestricted free forward displacement of said second column portion with respect to said second body structure.

2. An energy absorbing steering column for a motor vehicle having first and second spaced-apart body structures, said steering column having first and second spaced-apart column support portions, first means constructed to support said first column portion on said first body structure, said first means being constructed to prevent forward displacement of said first column portion, second means supporting said second column portion on said second body structure, said second means being constructed to prevent the rearward displacement of said second column portion, One of said first or second means having adjustable means constructed to load a portion of said steering column between said first and second column portions in compression, said second means being constructed to permit unrestricted free forward displacement of said second column portion with respect to said second body structure.

3. An energy absorbing steering column for a motor vehicle having first and second spaced-apart body structures, said steering column having first and second spaced-apart column support portions, said steering column having a plastically deformable energy absorbing section situated between said first and second support portions, first means constructed to support said first column support portion on said first body structure, said first means being constructed to prevent forward displacement of said first column support portion, second means supporting said second column support portion on said second body structure, said second means being constructed to prevent the rearward displacement of said second column support portion, one of said first and second means including adjustable means constructed to load a portion of said steering column in compression, said second means being constructed to permit the free disengagement of said second steering column support portion from said second body structure upon deformation of said energy absorbing section when a forwardly directed impact load is exerted against the rearward end of said steering column.

4. An energy absorbing steering column for a motor vehicle having spaced-apart body support structures, said steering column including an outer tube having an axially collapsible energy absorbing section, said outer tube having a first support portion disposed forwardly of said energy absorbing section and a second support portion disposed rearwardly of said energy absorbing section, first means supporting said first outer tube support portion on first body structure against forward displacement, second means supporting said second outer tube support portion on second body structure, said second means being constructed to support said second outer tube support portion against lateral and rearward displacement, said second outer tube support portion being freely displaceable in a forward direction with respect to said second body structure, adjustable means constructed to force said first outer tube support portion into engagement with said first body structure and said outer tube support portion into engagement with said second body structure.

5. An energy absorbing steering column for a motor vehicle according to claim 4 and including:

said steering column including a telescopically collapsible steering shaft rotatably supported in said outer tube.

6. An energy absorbing steering column for a motor vehicle according to claim 4 and including:

said energy absorbing section comprising a corrugated portion constructed to be plastically deformable under an impact load above a predetermined minimum.

7. An energy absorbing steering column for a motor vehicle according to claim 4 and including:

said steering column including a telescopically collapsible steering shaft rotatably supported in said outer tube, said energy absorbing section comprising a corrugated portion constructed to be plastically deformable under an impact load above a predetermined minimum, said first means engaging the forward end of said corrugated portion.

8. An energy absorbing steering column according to claim 4 and including:

said adjustable means including a plurality of threaded members supported on said second outer tube support portion and having rearwardly pointing tapered portions, said second body structure having openings receiving said tapered portions, said threaded members being extendable to force said steering column forwardly with respect to said second body structure and said first outer tube support portion into engagement with said first body structure.

9. An energy absorbing steering column according to claim 4 and including:
threadedly adjustable means engaging said first outer tube support portion and said first body structure,
said threadedly adjustable means being constructed to cause the rearward displacement of said steering column with respect to said second body structure and said second outer tube support portion into engagement with said second body structure.

10. An energy absorbing steering column for a motor vehicle having a vehicle toe board and a body mounted bracket,
said steering column including a telescopically collapsible steering shaft and an outer tube surrounding said shaft,
said outer tube having an energy absoring collapsible section,
a first column portion situated forwardly of said energy absorbing section,
an aperture in said toe board and said first column portion being disposed in said aperture,
reaction means supporting said first column portion on said toe board,
said body bracket having forwardly opening sockets,
said column having a second column portion spaced rearwardly of said energy absorbing section,
said second column portion having adjustable means constructed to engage said sockets of said body bracket,
said adjustable means being constructed to increase the effective length of said steering column supported between said toe board and said body bracket.

11. An energy absorbing steering column according to claim 10 and including:
said adjustable means being constructed to load said energy absorbing section in compression.

* * * * *